April 18, 1933.  O. SELLING  1,904,805
ELECTRICAL LEAD-IN
Filed Feb. 7, 1929
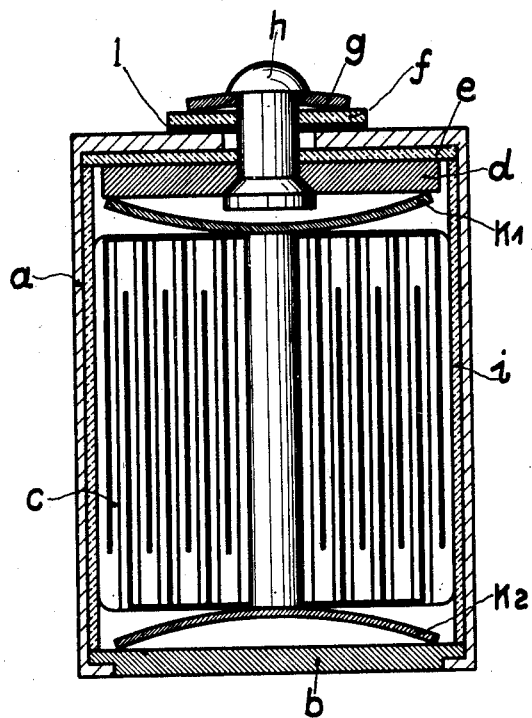
Inventor
Otto Selling
by Steward & McKay
his attorneys Patented Apr. 18, 1933

1,904,805

UNITED STATES PATENT OFFICE

OTTO SELLING, OF STUTTGART, GERMANY, ASSIGNOR TO ROBERT BOSCH AKTIEN-GESELLSCHAFT, OF STUTTGART, GERMANY

ELECTRICAL LEAD-IN

Application filed February 7, 1929, Serial No. 338,185, and in Germany February 27, 1928.

The present invention relates to electrical leads-in and more particularly to leads-in for condensers for ignition apparatus.

The problem is frequently met in electro-technology of passing leads in an insulated manner through the walls of metal casings which are to be thoroughly sealed against moisture. Such leads-in for small apparatus, for example for paper-wound condensers constructed in metal casings, have hitherto been very difficult to construct cheaply and yet reliably.

It has for example been proposed to construct wound condensers in metal boxes and to seal the latter by covers of insulating material which are secured by bending or crimping over the upper edge of the metal box. One coating of the condenser is conductively connected with the metal box and the second coating is connected with a lead passing through the cover. The gap between this lead and the cover and also at the edge of the crimped or bent-over portion, is sealed with varnish.

With frequent changes in temperature and similar stresses, such as may easily occur in electrical apparatus, such joints, however do not remain very fluid-tight.

Leads-in have also been obtained by passing rivets into the walls of the cover to be pierced with the interposition of insulating material. Rigid leads-in of this type also easily become non-fluid-tight, owing to changes in temperature.

The present invention produces a permanently fluid-tight lead-in of the rivet type by inserting a powerful spring washer between the insulating washer located on the wall of the box and the rivet head, whereby even an elongation of the rivet, caused by increased temperature, such a tension between the rivet head and the sealing insulating washer is maintained that the sealing remains perfect.

A paper-wound condenser for magneto ignition apparatus constructed in a completely sealed metal box is shown in the drawing as an example of construction.

$a$ is a metal box which gives the essential shape to the cover. One end of the box is provided centrally with a hole of such diameter that a rivet is adapted to pass therethrough with considerable play.

A washer $e$ of insulating material of the same dimensions as the internal superficial dimensions of the box so that it may fit tightly therein is first placed inside the box and directly against the inner face of the end of this. Such washer $e$ is provided centrally with a hole having the same diameter as the rivet and also serves to insulate and centre the rivet $h$.

A strong metal washer $d$, which remains out of contact with the wall of the box and takes up the pressure of the rivet $h$ after the latter has been riveted, is pressed against the free face of the insulating washer i. e. from inside the box.

Outside the box a washer $f$ of insulating material is first placed over the rivet $h$. A powerful spring washer $g$ follows, on to which the rivet is then riveted with powerful pressure so that the washer $g$ is highly tensioned.

The curve of the spring washer $g$ after riveting need only be very small. In the drawing it is shown as forced upwards for clearness.

A thin intermediate layer of semi-plastic substance $l$, such as varnished silk, is preferably introduced between the insulating washer $f$ and the base of the box in order to fill up small irregularities.

The condenser $c$ wound in the known manner is then introduced into the box thus prepared, with interposition of the insulating sleeve $i$ and also a spring $k_1$ ensuring good contact of one coating with the lead-in. The contact of the second coating with the housing is ensured by a second spring $k_2$ over which the metallic cover $b$ is sprung or soldered into the box.

I claim:

1. An electrical lead-in adapted to exclude moisture from a supporting casing comprising in combination a perforated wall, an electrical conductor having a head formed on at least one end thereof and extending through said perforation in said wall, a washer of insulating material on one side of said wall, a washer of conducting material adapted to be positioned against the outer face of said insulating washer, a second washer of insulating material on the opposite side of said wall, one of said insulating washers comprising a thin sheet of semi-plastic material, and metallic resilient means interposed between said second insulating washer and the head of said electrical conductor for maintaining a substantially constant pressure on said insulating washers regardless of the contraction or expansion of the lead-in unit due to temperature variations whereby a moisture tight seal is obtained between the conductor and the wall.

2. An electrical lead-in adapted to exclude moisture from a supporting casing comprising in combination a perforated wall, an electrical conductor having a head formed on at least one end thereof and extending through said perforation in said wall, a washer of insulating material on one side of said wall, a washer of conducting material adapted to be positioned against the outer face of said insulating washer, a second washer of insulating material on the opposite side of said wall, metallic resilient means interposed between said second insulating washer and the head of said electrical conductor for maintaining a substantially constant pressure on said insulating washers regardless of the contraction or expansion of the lead-in unit due to temperature variations whereby a moisture tight seal is obtained between the conductor and the wall, and a further washer of semi-plastic insulating material between said second insulating washer and said wall and adapted for filling up small irregularities in the contacting surfaces thereof.

3. An electrical lead-in adapted to exclude moisture from a supporting casing comprising in combination a perforated wall, an electrical conductor having a head formed on at least one end thereof and extending through said perforation in said wall, a washer of insulating material on one side of said wall, a washer of conducting material adapted to be positioned against the outer face of said insulating washer, a second washer of insulating material on the opposite side of said wall, metallic resilient means interposed between said second insulating washer and the head of said electrical conductor for maintaining a substantially constant pressure on said insulating washers regardless of the contraction or expansion of the lead-in unit due to temperature variations whereby a moisture tight seal is obtained between the conductor and the wall, and a further washer of varnished silk between said second insulating washer and said wall and adapted for filling up small irregularities in the contacting surfaces thereof.

4. A condenser comprising a metallic casing having a perforated end, windings within said casing, an electrical conductor having a head formed thereon at at least one end and extending through said perforation in said end of said casing, an insulating washer on the inner side of said end, a washer of electrical conducting material on the inner face of said insulating washer, resilient means positioned between said washer of electrical conducting material and said windings, a second washer of insulating material on the outside of said end of said casing, a thin sheet of semi-plastic material interposed between said second washer and said casing, and metallic resilient means interposed between said second washer of insulating material and the head of said electrical conductor for maintaining a substantially constant pressure on said insulating washers regardless of the contraction or expansion of the lead-in unit due to temperature variations whereby a moisture tight seal is obtained between the conductor and the wall.

5. A condenser comprising a metallic casing having a perforated end, windings within said casing, an electrical conductor having a head formed thereon at at least one end and extending through said perforation in said end of said casing, an insulating washer on the inner side of said end, a washer of electrical conducting material on the inner face of said insulating washer, a metallic spring washer positioned between said washer of electrical conducting material and said windings, a second washer of insulating material on the outside of said end of said casing, a thin sheet of semi-plastic material interposed between said second washer and said casing, and a metallic spring washer interposed between said second washer of insulating material and the head of said electrical conductor for maintaining a substantially constant pressure on said insulating washers regardless of the contraction or expansion of the lead-in unit due to temperature variations whereby a moisture tight seal is obtained between the conductor and the wall.

6. An electrical lead-in as in claim 1 in which said electrical conductor comprises a rivet, and said resilient means comprise an annular dished metallic washer, the inner periphery of which contacts at all points with said head and the outer periphery of which contacts at all points with the adjacent insulating washer.

7. An electrical lead-in adapted to exclude moisture from a supporting casing comprising in combination a perforated wall, an electrical conductor having a head formed on at least one end thereof and extending through said perforation in said wall, a washer of insulating material on one side of said wall, a washer of conductor material adapted to be positioned against the outer face of said insulating washer, a second washer of insulating material on the opposite side of said wall, one of said insulating washers having a thin layer of semi-plastic material on its inner face and in contact with said wall, and metallic resilient means interposed between said second insulating washer and the head of said electrical conductor for maintaining a substantially constant pressure on said insulating washers regardless of the contraction or expansion of the lead-in unit due to temperature variations whereby a moisture tight seal is obtained between the conductor and the wall.

In testimony whereof I have hereunto affixed my signature.

OTTO SELLING.